United States Patent
Böhme et al.

(10) Patent No.: US 10,877,132 B2
(45) Date of Patent: Dec. 29, 2020

(54) METHOD OF OPERATING A SCANNER AND SCANNER

(71) Applicant: SICK AG, Waldkirch/Breisgau (DE)

(72) Inventors: Max Böhme, Freiburg (DE); Michael Engler, Sexau (DE)

(73) Assignee: SICK AG, Waldkirch/Breisgau (DE)

( * ) Notice: Subject to any disclaimer, the term of this patent is extended or adjusted under 35 U.S.C. 154(b) by 583 days.

(21) Appl. No.: 15/676,715

(22) Filed: Aug. 14, 2017

(65) Prior Publication Data
US 2018/0052225 A1 Feb. 22, 2018

(30) Foreign Application Priority Data

Aug. 16, 2016 (DE) .......... 10 2016 115 201

(51) Int. Cl.
| | | |
|---|---|---|
| *G01S 7/48* | (2006.01) | |
| *G01S 7/481* | (2006.01) | |
| *G01S 7/4861* | (2020.01) | |
| *G01S 17/42* | (2006.01) | |
| *G01S 17/931* | (2020.01) | |

(52) U.S. Cl.
CPC .......... *G01S 7/4817* (2013.01); *G01S 7/4861* (2013.01); *G01S 17/42* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 2006/0089799 A1* | 4/2006 | Endoh | G01S 7/415 701/300 |
| 2012/0044326 A1* | 2/2012 | Michaelis | G01S 7/4817 348/46 |
| 2014/0138518 A1 | 5/2014 | Hammes | |
| 2015/0015868 A1 | 1/2015 | Jachman et al. | |

FOREIGN PATENT DOCUMENTS

| | | |
|---|---|---|
| DE | 10149768 A1 | 4/2003 |
| DE | 102009055990 A1 | 7/2010 |
| DE | 102012112987 B3 | 12/2013 |
| EP | 1391750 A2 | 2/2004 |
| EP | 1391752 A2 | 2/2004 |
| EP | 2703837 A1 | 3/2014 |
| EP | 2735887 A1 | 5/2014 |
| EP | 2824478 A1 | 1/2015 |

OTHER PUBLICATIONS

European Search Report dated Jan. 25, 2018 issued in corresponding European Application No. 17185293.2.
Communication dated Jun. 9, 2017 issued in corresponding German Application No. 10 2016 115 201.3.

* cited by examiner

*Primary Examiner* — Hovhannes Baghdasaryan
(74) *Attorney, Agent, or Firm* — Nath, Goldberg & Meyer; Jerald L. Meyer

(57) ABSTRACT

The present invention relates to a method of operating a scanner for monitoring an least two-dimensional protected field that is divided into a plurality of cyclically scannable monitored fields, wherein the scanner comprises at least one light transmitter and at least one light receiver. The invention further relates to a scanner for monitoring an at least two-dimensional protected field.

8 Claims, 2 Drawing Sheets

METHOD OF OPERATING A SCANNER AND SCANNER

Figure 1:
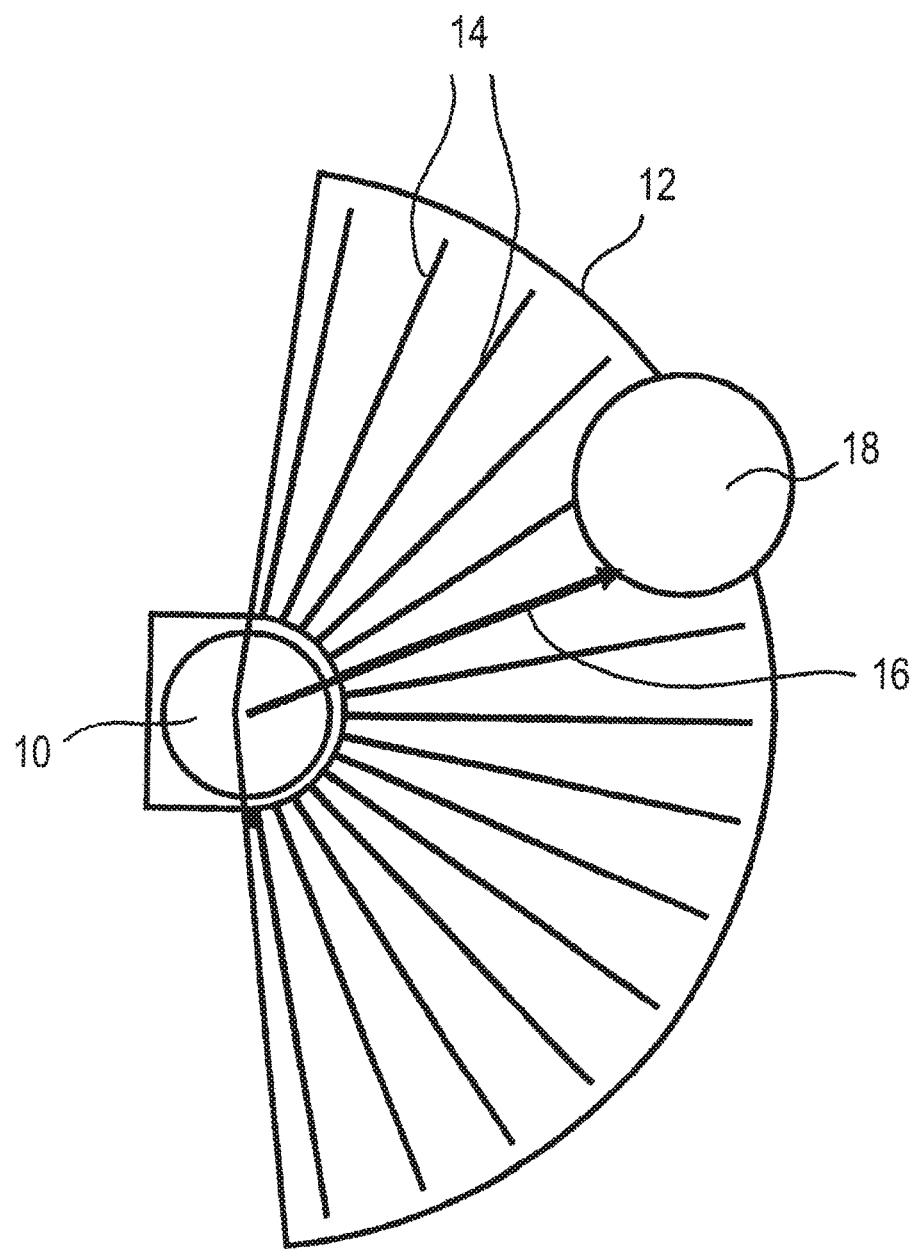

The present invention relates to a method of operating a scanner for monitoring an at least two-dimensional protected field that is divided into a plurality of cyclically scannable monitored fields, wherein the scanner comprises at least one light transmitter and at least one light receiver.

In the present text, a scanner means a monitoring sensor configured as a scanner. Such a scanner can be configured as a laser scanner, for example. A transmitted light beam generated by a light transmitter, e.g. by a laser or the like, is directed via a light deflection unit into the protected field to be monitored and is reflected or remitted there by an object that may be present. The reflected or remitted light moves back to the scanner again and is detected by the light receiver there. The light deflection unit is designed as pivotable or rotatable as a rule such that the light beam generated by the light transmitter sweeps over a protected field corresponding to the pivot movement or rotational movement. If a reflected light signal received by the light receiver is received from the protected zone, a conclusion can be drawn on the angular position of the object in the protected zone from the angular position of the deflection unit.

If the scanner detects an unauthorized object in the protected field, it can output a corresponding object detection signal, for example.

Such scanners are used, for example, with moving or stationary machines or vehicles in which a hazardous zone has to be monitored for safety reasons that may not be breached either by persons or by objects in the operation of the machine or vehicle. If the presence of an unauthorized object, for example of a limb of an operator, is detected in the hazardous zone by the scanner, a shut-down of the machine, a stopping of the vehicle or the like can be effected on the basis of the object detection signal.

However, small particles such as dust penetrating into the protected field, chips flying around, raindrops or snowflakes can result in an unwanted shut-down of the machine or a stopping of the vehicle. Such false positive object detection signals reduce the availability of the machine or of the vehicle.

To avoid this disadvantage, the concept of a so-called multiple evaluation can be used, for example. This concept provides that a respective two or more consecutive scanning cycles are observed, with an object having to be detected at the same point or within a defined environment in each of these scanning cycles to trigger an object detection signal. It is assumed in this respect that those objects that could trigger a false positive object detection signal move relatively fast and are therefore only detected in some of the scanning cycles observed and/or are detected in all the scanning cycles, but at positions very far apart from one another.

The robustness of the sensor with respect to disturbances based on small occluding objects or particles such as insects, raindrops, material chips or snowflakes is admittedly increased by such a multiple evaluation so that the availability of a machine monitored by the sensor is increased. However, the response time of the sensor also increases with the number of scanning cycles to be evaluated since a multiple scanning requires correspondingly more time. An increased response time can, however, make it necessary, for example, to reduce the working speed of the monitored machine since it has to be ensured, for example, that a safe stopping has taken place before the object (that is, for example, an endangered person) has approached the machine or the machine (for example, a driverless transport system) has approached an endangered person. A further possibility of countering this is to increase the size of the monitored protected field. The object (for example, an endangered person) would thus admittedly be detected earlier, but the probability of an incorrect shutdown increases since a greater area is monitored.

It is proposed in DE 10 2009 055 990 B4 that only those objects can trigger an object detection signal that are located within the protected field for longer than a predefinable dwell time, with different dwell times being able to be predefined for different monitored fields.

A safety laser scanner is described in EP 2 703 837 B1 in which light pulses of two different wavelengths are transmitted with a time offset and are evaluated accordingly for compensation of impaired visibility that can be caused by fog, rain, snow or dust.

DE 101 49 768 A1 proposes a laser scanner in which a disturbance impairing the visual range is recognized with reference to characteristic disturbance properties that can be identified by means of a sensor by evaluation of the reflected radiation.

Finally, DE 10 2012 112 987 B3 deals with an optoelectronic sensor in which a degree of impaired visibility is determined in dependence on the angle for an impaired visibility in the direction of the transmitted light beam and the degree of impaired visibility is evaluated in dependence on the angle.

It is the object of the invention to provide a method of operating a scanner that ensures a reliable recognition of unauthorized objects in the protected field and simultaneously to minimize an impairment of the scanner operation by false positive detection signals that originate from objects that cannot impair safety due to their size such that the scanner or a machine monitored by the scanner can be operated with high availability.

The object is satisfied by a method having the features of claim 1.

The method in accordance with the invention of operating a scanner for monitoring an at least two-dimensional protected field that is divided into a plurality of cyclically scannable monitored fields, wherein the scanner comprises at least one light transmitter and at least one light receiver, comprises the steps:

transmitting transmitted light beams into the protected field by the light transmitter;

receiving light that is reflected or remitted by an object that may be present in the protected field by the light receiver;

generating a specific received signal for the respective monitored field on the basis of the received light, with all the monitored fields of the protected field being scanned once within a scanning cycle;

determining a frequency of occurrence at which received signals are generated; and determining a degree of detection safety at least on the basis of the frequency of occurrence, with the value of the degree of detection safety being increased as the frequency of occurrence falls and being decreased as the frequency of occurrence rises.

A monitored field is in particular understood as a spatial region into which a respective transmitted light beam is transmitted, with the transmitted light beams in particular being able to be transmitted in pulsed form. However, in particular with a continuous transmission of the transmitted light beams, a monitored field can also be considered as a spatial region in which the light receiver "looks" at a respective scanning point in time or at a respective scanning position, in particular a scanning angle position, and optionally for an associated scanning time period, i.e. the light receiver is activated and/or evaluated. The frequency of occurrence in this respect corresponds, for example, to a number of generated received signals standardized with respect to the scanned region. As a rule, this number is directly correlated with the number of received signals per time unit. A simple possibility provides that the frequency of occurrence is determined with reference to the number of generated received signals per time unit. The frequency of occurrence can as a rule be determined globally for all the monitored fields of the protected field. It is, however, also not precluded to determine a specific frequency of occurrence individually for each monitored field or for groups having a respective plurality of monitored fields.

The named degree of detection safety thus represents a quantifying measure for the environmental conditions under which the scanner is operated. If disturbing objects that may contribute to the triggering of false positive object detection signals are not present at all or are only present in a very small number, as a rule only very few received signals are generated per time unit. This signals to the scanner that the environmental conditions under which the scanner is operated are not critical and rules in accordance with which the scanner outputs output signals to a signal output of the scanner can, for example, be selected or can be predefined differently than on the presence of critical environmental conditions in which disturbing particles such as insects, raindrops, material chips or snowflakes relatively frequently penetrate into the protected field and result in an increased frequency of occurrence of received signals. If the robustness of the scanner with respect to disturbances is to be kept at a constant level under adverse environmental conditions in comparison with ideal environmental conditions, rules or conditions that influence the internal operation of the scanner or rules or conditions that underlie an output of output signals must be changed. These rules or conditions can be fixed on the basis of the degree of detection safety, which will be explained in more detail in the following. The scanner is accordingly operated on the basis of the degree of detection safety.

The degree of detection safety can adopt both discrete values that can be determined, for example, on the basis of one or more threshold values for the determined frequency of occurrence or also continuous or quasi-continuous values, e.g. caused by a digitization.

In accordance with an advantageous embodiment of the method in accordance with the invention a first signal can be output to a signal output of the scanner on the basis of the degree of detection safety. This signal output can, for example, be connected to a machine to be monitored by the scanner or to a vehicle and can trigger specific measures in this machine or in this vehicle. It can thus, for example, be signaled to the machine or to the vehicle on the presence of adverse environmental conditions that result in a reduced degree of detection safety that the working speed of the machine or a travel speed of the vehicle has to be reduced or that the operation generally has to take place in a safe mode. This signaling can in particular comprise the fact that it is communicated to the machine or to the vehicle that the response time of the scanner has increased due to changes of the operating conditions of the scanner, which will be explained in more detail in the following. The named first signal can adopt a continuous or quasi-continuous value or can be formed as a discrete single-stage or multi-stage switch signal when the degree of detection safety has fallen below or exceeded one or more predefined threshold values.

In this respect, the degree of detection safety can, for example, be forwarded to the signal output for further processing. Alternatively, the resulting response time can also be determined from the degree of detection safety and can be output to fix the maximum working speed or travel speed.

For example, the signal output at the signal output can have the effect that a driverless transport system is operated at a reduced travel speed when, for example, snowfall in the operating environment of the scanner results in an increase in the frequency of occurrence at which received signals are generated and the degree of detection safety is thereby lowered. Conversely, the travel speed can be further increased when the snowfall lessens or stops and thus the frequency of occurrence of the received signals falls and the degree of detection safety increases again.

Finally, it is also possible on a change of the degree of detection safety to trigger measures that correspondingly influence the response time and to communicate this change of the response time to the signal output at an early time or, for example, to indicate it by a display so that this change of the response time can, for example, be taken into account by a user or by a control disposed downstream. Such measures can, for example, be a change of the degree of the multiple evaluation or the change of the angular resolution.

In accordance with a further advantageous embodiment of the invention, it can be determined on the basis of the received signals generated over a predefined number of consecutive scanning cycles (in the following also "number of multiple evaluations") whether a detected object satisfies at least one predefined object detection criterion for an unauthorized object and an object detection signal can be generated when the object detection criterion is satisfied, with the predefined number of multiple evaluations being determined at least on the basis of the degree of detection safety. Unlike with conventional methods in which the number of multiple evaluations is fixedly predefined, a dynamic adaptation of the number of multiple evaluations takes place in accordance with this embodiment in dependence on the degree of detection safety and thus in particular in dependence on the prevailing environmental conditions. The named object detection signal can, for example, be output, alternatively or additionally to the named first signal, as a second signal to a (further) signal output of the scanner and can trigger specific measures at a machine connected to the scanner or at a vehicle, said measures in particular being able to be further-going in comparison with the measures triggered by the named first signal and can, for example, comprise the fact that the machine is shut down or the vehicle is braked to a standstill.

The value of the degree of detection safety can, for example, directly represent the predefined number of multiple evaluations. The received signals generated during a respective cycle can, for example, be stored for the predefined number of multiple evaluations and the object detection signal can be generated on the basis of the stored received signals.

The aforesaid predefined object detection criterion can, for example, comprise the fact that a received signal that signals the presence of an object in one or in a plurality of mutually adjacent monitored fields has to occur in a plurality of consecutive scanning cycles, namely the predefined number of consecutive scanning cycles (number of multiple evaluations) in the same monitored field or monitored fields or in a defined environment of this monitored field or of these monitored fields so that an object detection signal is generated. For example, with a driverless transport system, the scanner can be operated with a minimal number of consecutive scanning cycles, for example 1 scanning cycle, when a high degree of detection safety signals the presence of favorable environmental conditions, i.e. without disturbing particles. Since safety-critical objects can be recognized within a scanning cycle, the response time of the scanner is very short in this mode. If the environmental conditions deteriorate, for example due to rain, snowfall, dust accumulation or the like, the degree of detection safety reduces and has the result that the predefined number of multiple evaluations is incremented, for example to 2, 3 or more. The robustness of the scanner or the availability of a connected machine or of a connected vehicle can thereby be substantially maintained since the increased number of scanning cycles that are evaluated makes it possible to discriminate the disturbing particles from actually safety-critical objects.

It has proven advantageous for the object detection criterion to comprise the fact that it is determined for the predefined number of multiple evaluations that at least one detected object has a predefined minimum size and/or is in particular stationary in at least one of the monitored fields. In this respect, stationary objects or also objects moving within a predefined speed range or angular speed range can satisfy the object detection criterion. A stationary object is also understood in this context as an object at a stationary angle that admittedly remains at the same angular position, but changes its distance from the scanner, which cannot be detected, for example, due to a lack of a distance measurement.

The predefined number of multiple evaluations is advantageously increased when the degree of detection safety is reduced and/or the predefined number of multiple evaluations decreases when the degree of detection safety is increased.

An increased response time that is due to an increased predefined number of multiple evaluations and the safety risks associated therewith can advantageously be compensated in that—as already mentioned above—a corresponding first signal is output to a signal output of the scanner that has the result, for example, that the machine or the vehicle is operated at reduced working speed such that the increased response time can be compensated by a reduced stopping time of the machine up to the standstill or by a reduced braking distance of the vehicle. If the environmental conditions improve again, the predefined number of multiple evaluations can be reduced so that the response time is again shortened and the machine or the vehicle can be operated at higher speed or at the original speed. As described, this response time can be communicated to a signal output so that it can be taken into account by a control connected downstream. It can, for example, additionally be indicated on a display unit to advise a user of the changed response time.

The determination of the frequency of occurrence at which received signals are generated and the determination of the degree of detection safety on the basis of this frequency of occurrence can comprise the fact that the number of registered received signals is determined for a predefined time period and that the degree of detection safety is set to a predefined value on the basis of the determined number of registered received signals. The degree of detection safety can, for example, be set to a maximum value if no received signal was registered in the predefined time period, Depending on the number of registered received signals, the degree of detection safety can be set to lower values, with the association of the values being able to take place, for example, on the basis of a look-up table or by means of a corresponding function. The named predefined time period does not necessarily have to be fixedly predefined, but can also be dynamically adapted, in particular in an iterative manner, to the respective number of registered received signals.

The frequency of occurrence can equally be standardized to a predefined spatial region (that is, for example, an angular range swept over by the laser beam). via which the number of registered received signals is determined.

In accordance with a further advantageous embodiment of the method, a respective received signal can also comprise, in addition to the information on the angular position of the monitored field, information on the distance of an object located therein from the scanner. The scanner can thus be only an angle scanner or a distance-measuring scanner.

The size of a detected object is advantageously thereby determined in that the magnitude of an angular range over which the respective object extends is determined on the basis of the number of adjacent monitored fields in which the presence of an object was determined at substantially the same distance from the scanner and whose angular spacings and the determined distance of the object from the scanner is determined. The determined distance can in particular be an average distance that was determined from the distance of the respective monitored fields.

The method in accordance with the invention serves for the operation of a scanner, in particular of a laser scanner, preferably configured with a rotatable light deflection unit for deflecting the light of the light source into the protected field. The scanner is then configured for monitoring one or more scanning areas, with the monitored fields in particular being of sector shape. The monitored fields can in this respect be of sector shape in both two dimensions and three dimensions.

It is advantageous if the magnitude of the angular resolution at which the protected field is scanned is adjustable in dependence on the degree of detection safety, with the angular resolution being decreased when the degree of detection safety is increased and/or with the angular resolution being increased when the degree of detection safety is decreased. The named angular resolution behaves reciprocally to the angular spacing of two adjacent monitored fields so that a small angular resolution corresponds to a large angular spacing and vice versa. As a rule, only the size of the monitored fields and the number of monitored fields is changed by a change of the angular resolution since the magnitude of the angular range over which the protected field extends should typically not be changed. The number of scans per scanning cycle and thus the time duration of a scanning cycle is reduced by a reduction of the angular resolution. The response time of the scanner is thereby reduced so that, optionally, a machine connected to the scanner or a vehicle can be operated at higher speed. However, the range of the scanner can optionally be reduced when a predefined minimum size of objects to be detected is not be to fallen below.

As described, the changed response time can be communicated to a signal output so that it can be taken into account by a control connected downstream. It can, for example, additionally be indicated on a display unit to advise a user of the changed response time.

In accordance with a further advantageous embodiment of the method, the increase and/or the decrease of the value of the degree of detection safety takes place with a time delay on a change of the frequency of occurrence (at which received signals are determined). Adaptations of the degree of detection safety quickly following one another are hereby prevented. The time delay can respectively be of different amounts for the increase and the decrease. A slow response to a decreased frequency of occurrence and a fast response to an increased frequency of occurrence can thus take place, for example. Alternatively or additionally, the increase and/or the decrease of the predefined number of consecutive scanning cycles can likewise take place with a time delay.

Those received signals can advantageously also be taken into account for the determination of the degree of detection safety that are not due to an object present in the protected field. Such received signals can, for example, be due to a detection of external light by the light receiver, for example on a "dazzling" of the scanner.

The invention further relates to a scanner, in particular to a distance-measuring scanner for monitoring an at least two-dimensional protected field that is divided into a plurality of cyclically scannable monitored fields, wherein the scanner comprises at least one light transmitter, at least one light receiver and a control unit, with the control unit being configured for carrying out the method in accordance with any one of embodiments described above.

Further advantageous embodiments of the invention result from the dependent claims, from the description and from the drawings. Advantageous embodiments of the scanner in particular also result in connection with advantageous embodiments of the method.

Figure 2:
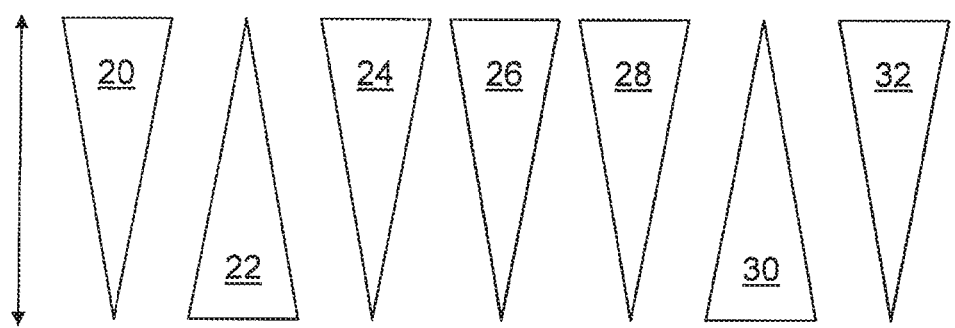

The invention will be described in the following with reference to an embodiment and to the drawings. There are shown:

FIG. 1 a schematic representation of a scanner for carrying out the method in accordance with the invention in whose protected field an object is present; and FIG. 2 a schematic comparative representation of values for different parameters that are of importance for the method.

FIG. 1 shows a scanner 10, for example a distance-measuring laser scanner, that in the present example monitors a protected field 12 that extends approximately over an angular range of 165°.

The scanner 10 has a light transmitter for transmitting a transmitted light beam 16 into the protected field 12; a light receiver for receiving light that is reflected or remitted by an object 18 that may be present in the protected field; and a deflection unit that is configured to vary the transmission angle, i.e. the angle at which the transmitted light beam 16 is transmitted with respect to the protected field 12 and, optionally also the received signal, i.e. the angle direction from which light reflected or remitted from an object with respect to the protected field 12, synchronously with respect to the transmission angle.

A number of light paths 14 that are scanned consecutively by the scanner 10 results in this manner. A sector-shaped monitored field is in this respect associated with each light path 14 and extends at both sides of the respective light path 14 since the transmitted light beam 16 does not propagate exactly along one line as shown the present schematic embodiment, but rather has a specific divergence. In the ideal case, the configuration of the scanner 10 takes place such that the monitored fields associated with the light paths 14 are adjacent to one another. Adjacent monitored fields can, however, also overlap or can be spaced apart from one another by a specific degree. Fifteen light paths 14 or monitored fields are provided in the present example.

In principle, the present invention is not restricted to such a laser scanner in which the individual light paths 14 are scanned consecutively in time. All the light paths 14 or groups of light paths 14 can also be synchronously scanned, which requires a corresponding number of light transmitter/receiver pairs. The scanner 10 furthermore does not necessarily have to have only one single scanning area that is defined by the plane of the drawing in the present example, but can rather also have a plurality of scanning areas, e.g. a plurality of scanning planes or scanning areas spaced apart from one another in parallel or a plurality of conical scanning areas having different azimuth angles. Provided that the scanner 10 is configured as a distance-measuring scanner, the determination of the distance from a detected object can take place in a manner known per se on the basis of the time of flight of the transmitted light beam 14 or of the phase shift between the modulated transmitted light and the received light.

The scanner 10 can have an integrated control unit that is configured for generating received signals on the basis of the light received by the light receiver. The received signals can specifically comprise information on the angular position of a monitored field and on the distance of the object from the scanner 10 for a monitored field in which light was scattered back from an object.

The protected field is cyclically scanned such that a time sequence of received signals is present for each light path 14 or for each monitored field.

The scanner 10 can comprise a storage device that stores the received signals over one or more scanning cycles.

The size of a detected object 18 can be determined on the basis of the determined distance of the object 18 from the scanner 10 and on the basis of the determined magnitude of the angular range over which the detected object extends. The determination of the magnitude of the angular range over which the object extends can in particular be determined on the basis of the number of adjacent monitored fields that are infringed by the presence of the object and on the basis of their angle intervals.

In accordance with a modification, the angular resolution of the scanner 10 can be changed. An increase in the angular resolution corresponds to a reduction in the angular spacing between two adjacent light paths 14 or monitored fields and vice versa. If the size of the protected field 12 should remain unchanged in this respect, the number of light paths 14 or of monitored fields has to be adapted accordingly.

If the angular resolution is decreased, the spacing of adjacent light paths 14 or of monitored fields for a predefined radial distance from the scanner 10 increases. On this basis, the range of the scanner 10 is limited in dependence on a minimum size for objects just to be detected. The spacing between two adjacent transmitted light beams 14 has to be smaller than the size of the object 18 for the reliable detection of an object 18 that is located at a distance from the sensor corresponding to the range. It is understood that on a reduction of the angular resolution, this spacing between adjacent transmitted light beams 14 increases and thus the range of the scanner is correspondingly decreased under the assumption of an unchanging minimum size for an object 18 to be detected.

The control unit of the scanner 10 is configured to determine a frequency of occurrence at which received signals are generated and to determine a degree of detection safety on the basis of this frequency of occurrence, with the value of the degree of detection safety being increased with a falling frequency of occurrence and being decreased with a rising frequency of occurrence. The frequency of occurrence in this respect corresponds, for example, to a number of generated received signals standardized with respect to the scanned region. As a rule, this number is directly correlated with the number of received signals per time unit. The frequency of occurrence can, for example, be defined as the number of received signals per angle unit (of the region swept over by the laser beam). With a scanner operated continuously at the same speed, the frequency of occurrence thus results as the number of received signals per time unit.

The frequency of occurrence can be determined globally for all monitored fields (that is from the sum over all monitored fields), but also specifically for every single monitored field or for a group of monitored fields. It is further possible to preclude certain received signals from the determination of the frequency of occurrence if it is found that the received signals go back to an object that is, for example, classified as safety-critical due to its dimensions.

For example, received signals that are not due to safety-critical objects, but rather go back to disturbances due to small particles, for example raindrops, snowflakes, material chips or the like (that is that go back to adverse environmental conditions), result in an increased frequency of occurrence of received signals. The degree of detection safety is reduced under such environmental conditions. If conversely the frequency of occurrence is decreased again due to improving environmental conditions, the degree of detection safety is increased again.

The control unit can be configured to carry out different measures on the basis of the degree of detection safety.

On the one hand, a first signal can thus be output to a signal output of the scanner 10 on the basis of the degree of detection safety. This signal can, for example, be output when the degree of detection safety falls below a predefined threshold value. This first signal can, for example, be used to initiate a stopping of the machine or of the vehicle or at least a reduction in the movement speed of the machine or of the vehicle with a machine monitored by the scanner 10 or with a vehicle.

The degree of detection safety can furthermore be used to fix a predefined number of consecutive scanning cycles (number of multiple evaluations) via which a determination is made whether a detected object satisfies at least one predefined object detection criterion for an unauthorized object, with the control unit generating an object detection signal when the object detection criterion is satisfied. The object detection signal can be output, alternatively or additionally to the first signal, as a second signal at an optionally further signal output of the scanner 10 and can trigger specific measures, in particular further-going measures, for example a fast shut-down, at a machine connected to the scanner 10.

As has already been explained above, the object detection criterion can comprise the fact that it is determined for the predefined number of consecutive scanning cycles that at least one detected object has a predefined minimum size and/or is in particular stationary or moving within a predefined speed range in at least one of the monitored fields. It is possible by an increase in this number of consecutive scanning cycles (number of multiple evaluations) to improve the robustness of the scanner 10 with respect to such disturbances under adverse environmental conditions with relatively frequently occurring disturbing particles that are not safety-critical per se. Since an actually safety-critical object thus has to be "observed" over a plurality of scanning cycles to be able to reliably distinguish it from a non-safety critical particle or small object, the response time of the scanner increases, i.e. the time between the ingress of a safety-critical object into the protected field and the output of an object detection signal that triggers corresponding safety measures in a machine connected to the scanner 10.

This increased response time can be compensated, for example, in that the machine is operated using increased safety measures, for example a reduced working speed or movement speed. For this purpose, the changed response time can, for example, be reported to a control disposed downstream or can be displayed to a user.

The present invention makes it possible to dynamically adapt these increased safety measures, i.e. in dependence on the environmental conditions. If the frequency of occurrence of disturbances due to small particles falls again and the environmental conditions thus improve, the preceding increase in the predefined number of multiple evaluations can be taken back so that the response time of the scanner also decreases again. The signal that triggers the corresponding safety precautions in the monitored machine can accordingly be taken back again or can at least be reduced so that the machine can again be operated at an increased or maximum operating speed.

The ratio or the mutual dependency of different parameters that are relevant to the method in accordance with the invention are represented by respective triangles in FIG. 2, with a small width of the triangle representing a low value and a large width representing a high value of the respective parameter.

The first triangle represents the frequency of occurrence 20 of received signals. As the frequency of occurrence 20 of the detection of received signals increases, the degree of detection safety 22 is accordingly decreased and vice versa.

On the presence of a high degree of detection safety 22, the predefined number 24 of consecutive scanning cycles over which a determination is made whether a detected object satisfies an object detection criterion (number of multiple evaluations) is set to a low value. If the degree of detection safety 22 is decreased, this predefined number 24 of scanning cycles is increased.

This predefined number 24 of scanning cycles correlates with the response time 26 of the scanner 10, i.e. as the number 24 of consecutive scanning cycles increases, the response time 26 also increases and vice versa.

Additionally or alternatively to an increase in the number of multiple evaluations 24 of the consecutive scanning cycles, provision can be made to increase the angular resolution 28 of the scanner 10 so that the angular spacing 30 between adjacent transmitted light paths 14 decreases reciprocally to the angular resolution 28 and vice versa.

Finally, the range 32 of the scanner 10 reduces (with a predefined desired absolute object resolution) as the angular resolution 28 decreases or as the angular spacing 30 increases.

FIG. 2 is intended only to qualitatively illustrate the relationships between the different values and parameters. A quantitative relationship between the respective values is not represented by FIG. 2.

REFERENCE NUMERAL LIST 10 scanner
12 protected field
14 light path
16 transmitted light beam
18 object
20 frequency of occurrence of received signals
22 degree of detection safety
24 predefined number of consecutive scanning cycles
26 response time 28 angular resolution
30 angular spacing
32 range

The invention claimed is:

1. A method of operating a scanner for monitoring an at least two-dimensional protected field that is divided into a plurality of cyclically scannable monitored fields, wherein the scanner comprises at least one light transmitter and at least one light receiver, comprising the steps of:
   transmitting transmitted light beams into the protected field by the at least one light transmitter;
   receiving light that is reflected or remitted by an object that may be present in the protected field by the at least one light receiver;
   generating a received signal for the respective monitored field on the basis of the received light, with all the monitored fields of the protected field being scanned once within a scanning cycle;
   determining a frequency of occurrence at which received signals are generated;
   determining a degree of detection safety at least on the basis of the frequency of occurrence, with the value of the degree of detection safety being increased as the frequency of occurrence falls and being decreased as the frequency of occurrence rises, wherein the degree of detection safety represents a quantifying measure for environmental conditions under which the scanner is operated; and
   determining whether a detected object satisfies at least one predefined object detection criterion for an unauthorized object on the basis of the received signals generated over a predefined number of multiple evaluations of consecutive scanning cycles, an object detection signal being generated when the object detection criterion is satisfied, with the predefined number of multiple evaluations of consecutive scanning cycles being determined at least on the basis of the degree of detection safety,
   wherein the object detection criterion comprises a determination being made for the predefined number of multiple evaluations of consecutive scanning cycles that at least one detected object has a predefined minimum size, the object detection criterion further comprising a determination being made for the predefined number of multiple evaluations of consecutive scanning cycles that at least one detected object is stationary in at least one of the monitored fields,
   wherein the predefined number of multiple evaluations of consecutive scanning signals is increased when the degree of detection safety is decreased,
   wherein the predefined number of multiple evaluations of consecutive scanning cycles is decreased when the degree of detection safety is increased, and/or
   wherein the scanner has a rotatable light deflection unit for deflecting the light of the at least one light transmitter into the protected field and is configured for a monitoring of one or more scanning areas, wherein the monitored fields are of sector shape, and wherein a magnitude of an angular resolution at which the protected field is scanned is adjustable dependent on the degree of detection safety, with the angular resolution being decreased when the degree of detection safety is increased and/or with the angular resolution being increased when the degree of detection safety is decreased.

2. The method in accordance with claim 1,
wherein the scanner is a laser scanner.

3. The method in accordance with claim 1,
wherein a first signal is output to a signal output of the scanner on the basis of the degree of detection safety.

4. The method in accordance with claim 1,
wherein the determination of the frequency of occurrence at which received signals are generated and the determination of the degree of detection safety on the basis of the frequency of occurrence comprise that the number of registered received signals is determined for a predefined number of scanned monitored fields or for a predefined period of time; and
the degree of detection safety is set to a predefined value on the basis of the determined number of registered received signals.

5. The method in accordance with claim 1,
wherein a respective received signal comprises information on at least one of the angular position of the monitored field and the distance of an object located therein from the scanner.

6. The method in accordance with claim 1,
wherein the size of a detected object is determined in that the magnitude of an angular range over which the respective object extends is determined on the basis of the number of adjacent monitored fields in which the presence of an object was determined at substantially the same distance from the scanner and whose angular spacings and the determined distance of the object from the scanner are determined.

7. The method in accordance with claim 1,
wherein the increasing and/or the decreasing of the value of the degree of detection safety takes/take place with a time delay on a change of the frequency of occurrence.

8. The method in accordance with claim 1,
wherein those received signals are also taken into account for the determination of the degree of detection safety that are not due to an object present in the protected field.

* * * * *